UNITED STATES PATENT OFFICE.

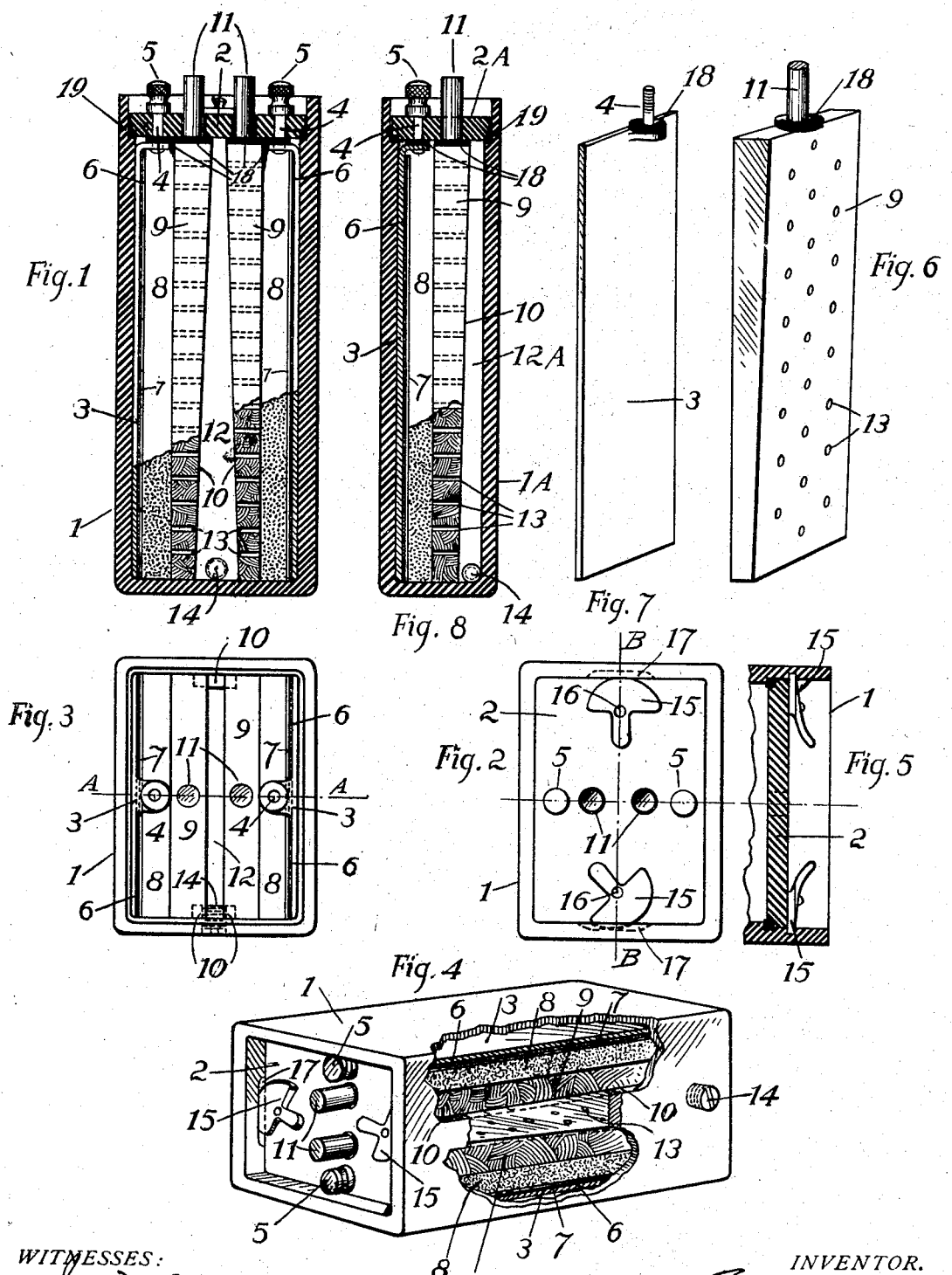

FRANK N. MASON, OF PITTSBURGH, PENNSYLVANIA.

REFILLABLE ELECTRIC BATTERY.

1,149,666.   Specification of Letters Patent.   Patented Aug. 10, 1915.

Application filed July 29, 1914. Serial No. 853,792.

*To all whom it may concern:*

Be it known that I, FRANK N. MASON, a citizen of the United States, residing at Pittsburgh, in the county of Allegheny and State of Pennsylvania, have invented new and useful Improvements in Refillable Electric Batteries, of which the following is a specification.

My invention relates generally to electric batteries of the refillable type, but more particularly to that type of battery employing compressed dry cakes of active and depolarizing material which is preferably moistened after it has been deposited in the battery casing.

The object of my invention is to simplify the construction of batteries of the said type and reduce the ultimate cost thereof, by replacing the exhausted elements.

Referring to the accompanying drawings, Figure 1 is a vertical section of a double or two-celled battery; Fig. 2, a top plan of Fig. 1; Fig. 3, a top view of Fig. 1 with the cover removed; Fig. 4, a perspective view with parts broken away; Fig. 5, a section of the upper end of the battery casing and cover on the line B—B, Fig. 2; Fig. 6, a perspective view of the carbon or negative element; Fig. 7, a perspective of the zinc or positive element; and Fig. 8, a vertical section of a single-celled battery.

Referring first to Figs. 1 to 7, 1 is a casing composed of vulcanite or other non-conductor of electricity. The four side walls and the bottom are preferably integral, the top or cover 2 being removable.

A sheet of zinc 3 lies against the inner surface of each side wall. Each sheet 3 has its upper end provided with a terminal screw 4, which extends up through the cover 2. Each screw is provided above the cover with a binding nut 5.

Against the opposing faces of the zinc sheets I place a layer of active material 6, such, for example, as a paste containing ammonium chlorid, and against the opposing faces of the layers of active material 6, I apply a sheet of porous absorbent material 7, such, for example, as blotting paper, to which the said paste may be attached.

Next to each sheet of blotting paper I place the depolarizing material 8 preferably compressed into compact cakes of uniform thickness. Each cake or layer 8 is pressed toward the adjacent zinc sheet 3 by a wedge 9 of carbon or other material suitable for the negative elements of the battery. The wedges are guided downwardly by the oppositely inclined shoulders 10 which extend preferably from the top to the bottom of the casing and are preferably integral with the ends of the casing. These shoulders are inclined downwardly and toward the cakes 8, so that, when each wedge is pushed down between a cake and a pair of shoulders 10 the wedge, the cake, the sheet 7, the active material, and the zinc will be pressed closely into a compact unit. The upper ends 11 of the wedges are reduced in cross-section and extend up above the cover 2 and constitute electric terminals.

The space 12 between the two wedges 9 constitutes a well or receptacle for gases, and for water for moistening the active material 7, the wedges being provided with transverse openings 13 through which the water in the well may obtain access to the active material. Water is supplied to the well 12 through an opening in the side which is provided with the screw plug 14. Water need remain in the well only long enough to moisten the active material properly, the surplus being drained off through the said opening, through which gases may from time to time be allowed to escape, if necessary.

The cover 2 is secured in place by the ends of the latches 15, secured to the cover 2 by the pivots 16, engaging in the slots 17 in the wall of the casing 1.

The form of my invention shown in Fig. 8 differs from that shown in Fig. 1 in this respect: that the zinc 3, the sheet 6, the active material 7, the cake 8, the wedge 9, and the shoulder 10 constituting one half of the battery shown in Fig. 1 are omitted in Fig. 8 and the right-hand end wall of the casing is located in proximity to the remaining wedge 9 to form the right hand wall of the well 12$^a$.

As my invention can be modified in its details and combinations, I desire to cover such modifications of the details and combinations shown and described as come within the scope of the appended claims.

I claim—

1. In a refillable electric battery, a positive element, a layer of active material, a sheet of absorbent material, a depolarizer, and a wedge, arranged in the order enumerated, a casing containing the same, and guiding means for causing the wedge to press the positive element, the active material, the sheet of absorbent material, the depolarizer, and the wedge into a compact unit.

2. In a refillable electric battery, a positive element, a layer of active material, a sheet of porous material, a depolarizer, and a wedge, arranged in the order enumerated, the said wedge constituting the negative element of the battery, a casing containing the same, and guiding means for causing the wedge to press the positive element, the active material, the sheet of porous material, the depolarizer, and the wedge into a compact unit.

3. In an electric battery, a casing, a perforated removable wedge-shaped partition therein constituting the negative element thereof, a depolarizer, and an active material on one side of the partition, there being a space for water adjacent to the opposite side of the partition, the perforation in the partition being arranged to conduct the water to the active material.

Signed at Pittsburgh, Pa., this 23rd day of July, A. D. 1914.

FRANK N. MASON.

Witnesses:
ALICE E. DUFF,
ELVA STANIER.